United States Patent
Kobayashi

(10) Patent No.: US 8,879,370 B2
(45) Date of Patent: Nov. 4, 2014

(54) OPTICAL DISK APPARATUS

(75) Inventor: Masayuki Kobayashi, Kuki (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 37 days.

(21) Appl. No.: 13/397,868

(22) Filed: Feb. 16, 2012

(65) Prior Publication Data

US 2012/0250474 A1    Oct. 4, 2012

(30) Foreign Application Priority Data

Mar. 30, 2011  (JP) ................................ 2011-073869

(51) Int. Cl.
- G11B 7/007 (2006.01)
- G06F 12/00 (2006.01)
- G06F 17/00 (2006.01)
- G11B 20/10 (2006.01)
- G11B 20/18 (2006.01)

(52) U.S. Cl.
CPC ...... G11B 20/1879 (2013.01); G11B 20/10527 (2013.01); *G11B 2220/2537* (2013.01); *G11B 2020/1062* (2013.01); *G11B 2220/218* (2013.01); *G11B 2220/216* (2013.01); *G11B 2020/10898* (2013.01)
USPC .................. 369/30.05; 369/30.07; 369/30.37; 369/30.09; 369/30.19; 369/13.25; 369/53.24; 369/84; 711/155; 711/103; 711/111; 711/134

(58) Field of Classification Search
USPC .......... 369/30.01–30.09, 30.18, 30.19, 30.25, 369/47.22, 13.16, 53.11, 13.25, 53.24, 369/47.12, 47.13, 84, 85; 360/281, 69, 53, 360/54, 16, 57; 711/154–156, 4, 103, 111
See application file for complete search history.

(56) References Cited

U.S. PATENT DOCUMENTS

| | | | |
|---|---|---|---|
| 8,588,945 B2 * | 11/2013 | Araki et al. ...................... 700/94 |
| 2005/0289314 A1 * | 12/2005 | Adusumilli et al. .......... 711/168 |
| 2006/0133245 A1 * | 6/2006 | Saeki ............................ 369/53.1 |
| 2007/0186065 A1 * | 8/2007 | Lee et al. ...................... 711/159 |
| 2011/0004725 A1 * | 1/2011 | Tanaka .......................... 711/103 |
| 2011/0289280 A1 * | 11/2011 | Koseki et al. ................. 711/154 |
| 2012/0144090 A1 * | 6/2012 | Song et al. .................... 711/102 |

FOREIGN PATENT DOCUMENTS

WO    WO 2004/086379 A1    10/2004

* cited by examiner

*Primary Examiner* — Wayne Young
*Assistant Examiner* — Dionne Pendleton
(74) *Attorney, Agent, or Firm* — Antonelli, Terry, Stout & Kraus, LLP.

(57) ABSTRACT

An optical disk apparatus which conducts overwriting of data on a rewritable optical disk or conducts write-once recording of data on a write-once optical disk includes a control unit for receiving a recording command which specifies a recording area and orders recording and receiving transfer data, and a collation unit for collating existing data on the optical disk with the transfer data. Upon reception of the recording command and the transfer data by the control unit, the existing data is collated with the transfer data by the collation unit, and overwrite recording of data in places where the transfer data is different from the existing data is conducted on the rewritable optical disk, or data in places where the transfer data is different from the existing data is recorded in an unrecorded area of the write-once optical disk.

4 Claims, 9 Drawing Sheets

OPTICAL DISK APPARATUS

INCORPORATION BY REFERENCE

The present application claims priority from Japanese application JP 2011-073869 filed on Mar. 30, 2011, the content of which is hereby incorporated by reference into this application.

BACKGROUND OF THE INVENTION

The present invention relates to an optical disk apparatus.

In recordable optical disks, there are rewritable optical disks which allow overwriting in the physically same position and write-once optical disks which do not allow overwriting. For example, there are DVD-RWs as the rewritable optical disks, and there are DVD-Rs as the write-once optical disks.

Furthermore, there is a technique of implementing logical overwrite recording by recording overwriting data in a physically different position on the write-once optical disk and giving an appearance of overwrite recording. For example, as the technique of implementing the logical overwrite recording, there is a technique shown in WO 2004/086379A1.

SUMMARY OF THE INVENTION

In the case where overwrite recording is conducted on the rewritable optical disk and in the case where logical overwrite recording is conducted on the write-once optical disk described in BACKGROUND OF THE INVENTION, there are problems described hereafter, respectively.

In the case where overwrite recording is conducted on the rewritable optical disk, there is a limit in the number of times the overwrite recording can be conducted. Because the recording quality is degraded gradually if overwrite recording is repeated in the physically same position on the rewritable optical disk.

In the case where logical overwrite recording is conducted on the write-once optical disk, there is also a limit in the number of times the overwrite recording can be conducted. Because overwrite recording becomes impossible if an unrecorded area runs out.

An object of the present invention is to increase the number of times the overwrite recording can be conducted on an optical disk.

The object of the present invention can be achieved by a configuration of an optical disk apparatus which conducts overwriting of data on a rewritable optical disk or conducts write-once recording of data on a write-once optical disk, the optical disk apparatus including a control unit for receiving a recording command which specifies a recording area and orders recording and receiving transfer data, and a collation unit for collating existing data on the optical disk with the transfer data, upon reception of the recording command and the transfer data by the control unit, the existing data being collated with the transfer data by the collation unit, and overwrite recording of data in places where the transfer data is different from the existing data being conducted on the rewritable optical disk, or data in places where the transfer data is different from the existing data being recorded in an unrecorded area of the write-once optical disk.

According to the present invention, it is possible to increase the number of times the overwrite recording can be conducted on an optical disk.

Other objects, features and advantages of the invention will become apparent from the following description of the embodiments of the invention taken in conjunction with the accompanying drawings.

DESCRIPTION OF THE EMBODIMENTS

An optical disk according to the present invention has a feature that when conducting an overwrite recording operation, existing data in a recording area on an optical disk to be subject to the overwrite recording is collated with overwriting data to be subject to the overwrite recording and data in a place where the existing data is different from the overwriting data is recorded onto the optical disk.

<Embodiment 1>

First, an operation at the time when logical overwrite recording is conducted on a write-once optical disk will be described.

Figure 1:
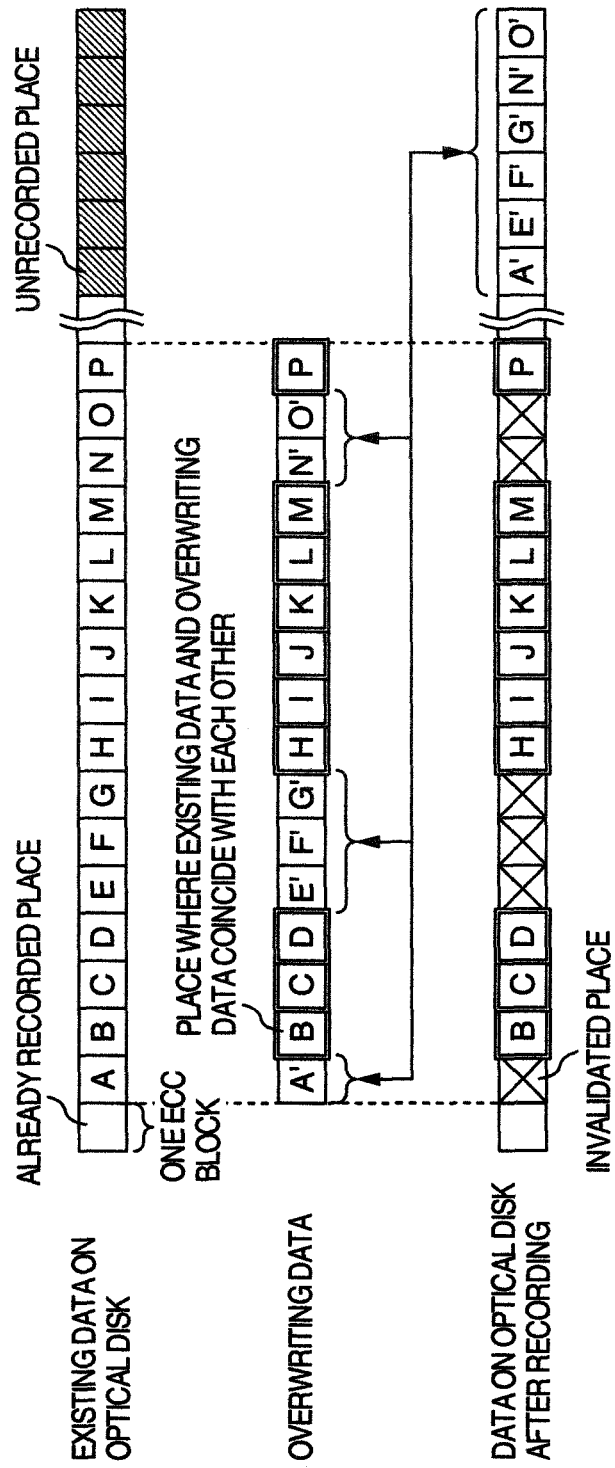
FIG. 1 is a diagram showing position relations among existing data on a write-once optical disk, overwriting data, and data on the optical disk after recording, when conducting logical overwrite recording on the write-once optical disk by using an optical disk apparatus according to the present invention.

FIG. 1 is a diagram showing position relations among existing data on a write-once optical disk, overwriting data, and data on the optical disk after recording, at the time when an optical disk apparatus according to the present invention conducts logical overwrite recording on the write-once optical disk. Each of squares arranged side by side in FIG. 1 represents one ECC (Error Correction Code) block. Unshaded squares represent already recorded squares, whereas shaded squares represent unrecorded squares. Each of reference characters A to P, A', E', F', G', N' and O' represents recorded data in an ECC block, and the same reference character represents the same data. Dashed lines extending downward from a head of an ECC block having existing data A recorded therein and an end of an ECC block having existing data P recorded therein represent a start position and an end position of a recording area where overwrite recording is conducted, respectively. Double framed squares B to D, H to M, and P in the overwriting data represent that they are the same data as existing data in the same places on the optical disk.

Only A', E', F', G', N' and O' which are included in the overwriting data and which are different from the existing data on the optical disk are recorded in unrecorded places on the optical disk as represented by position relations of data on the optical disk after recording. And places where A', E', F', G', N' and O' are recorded are made invalid. In this way, data in places where overwriting data is different from existing data on the optical disk are recorded in an unrecorded area on the optical disk. As compared with the case where all overwriting data are recorded in the unrecorded area, therefore, consumption of the unrecorded area is suppressed, and the number of times the logical overwrite recording can be conducted on the write-once optical disk is increased.

The foregoing description is nothing but an example. Kinds of data are not restricted to the combination of the data A to P, and the data A', E', F', G', N' and O'.

In the foregoing example, collation is conducted by taking one ECC block as the unit. However, the unit is not restricted to one ECC block.

Figure 2:
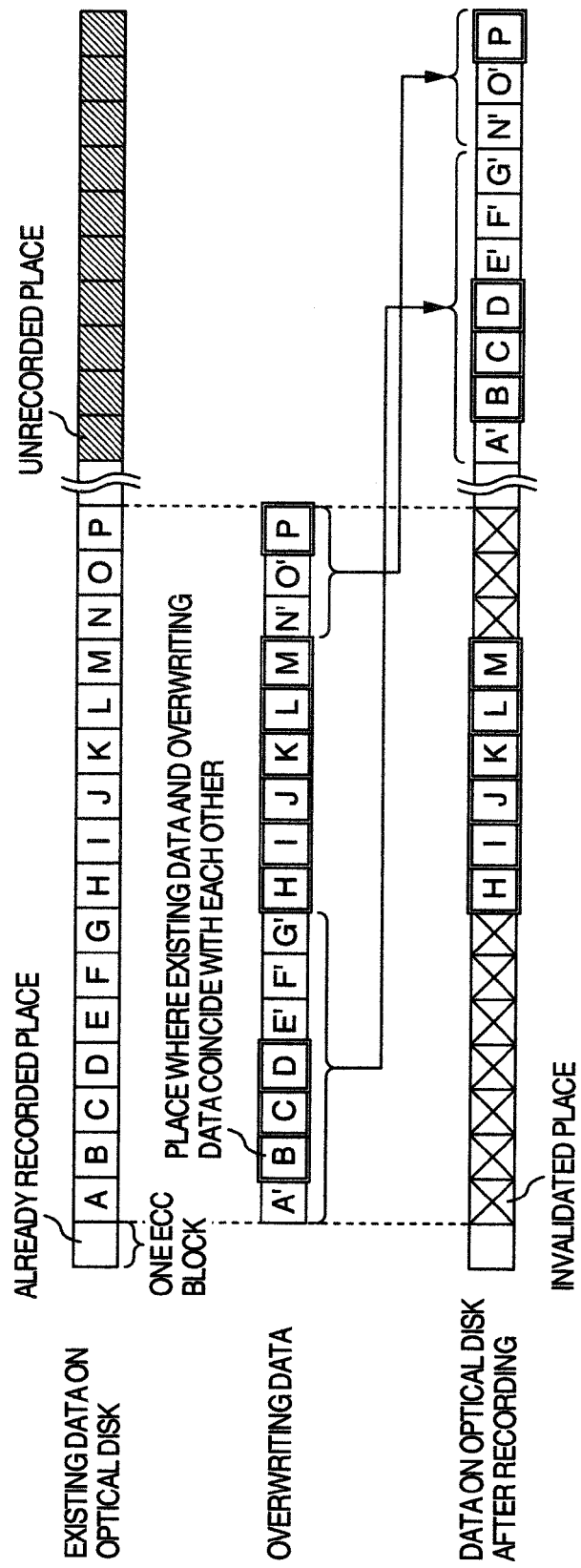
FIG. 2 is a diagram showing position relations among existing data on a write-once optical disk, overwriting data, and data on the optical disk after recording, when conducting logical overwrite recording on the write-once optical disk by using an optical disk apparatus according to the present invention and adopting a form which is different from that in FIG. 1.

FIG. 2 is a diagram showing position relations among existing data on a write-once optical disk, overwriting data, and data on the optical disk after recording, at the time when an optical disk apparatus according to the present invention conducts logical overwrite recording on the write-once optical disk which adopts a form different from that in FIG. 1. In the foregoing example shown in FIG. 1, data in places where overwriting data is different from existing data on the optical disk are recorded in an unrecorded area on the optical disk. However, data in places where overwriting data is different from existing data on the optical disk and data in places having a predetermined block length or less sandwiched between a place where overwriting data is different from existing data on the optical disk and another place where overwriting data is different from existing data on the optical disk or an end of the recording area may be recorded in an unrecorded area on the optical disk as shown in, for example, FIG. 2. In FIG. 2, the predetermined block length is set equal to a length of three ECC blocks.

Overwriting data B, C and D shown in FIG. 2 are in a place having a length of three ECC blocks sandwiched between A' and E' which are places where overwriting data is different from existing data on the optical disk. Therefore, the data B, C and D are objects of the recording. P in the overwriting data is also in a place having a length of one ECC block sandwiched between O' which is a place where overwriting data is different from existing data on the optical disk and an end of the recording area. Therefore, the overwriting data P is also an object of the recording.

It is possible to create an optical disk which is suppressed in the number of times of seeking at the time when reproducing data on the optical disk after recording and which copes with faster reproduction as compared with the form shown in FIG. 1 by adopting the form shown in FIG. 2.

In the above-described example, data in places where overwriting data is different from existing data on the optical disk and data in places having a predetermined block length or less sandwiched between a place where overwriting data is different from existing data on the optical disk and another place where overwriting data is different from existing data on the optical disk or an end of the recording area are recorded in an unrecorded place. However, the predetermined block length is not restricted to the length of three ECC blocks. As the length of three ECC blocks is made longer, an optical disk corresponding to faster reproduction can be created.

Heretofore, the case where the logical overwrite recording is conducted on the write-once optical disk has been described. However, effects of the present invention can also be obtained in the case where an optical disk drive according to the present invention conducts overwrite recording on a rewritable optical disk. Hereafter, a form in the case where overwrite recording is conducted on a rewritable optical disk will be described.

Figure 3:
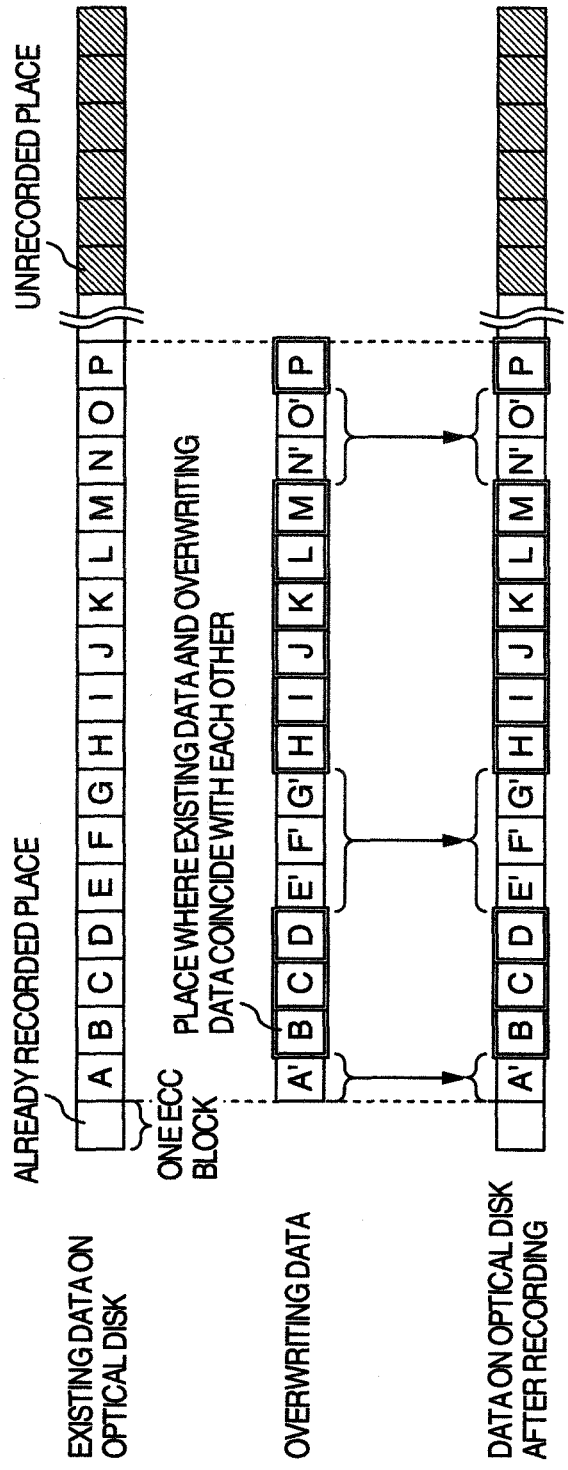
FIG. 3 is a diagram showing position relations among existing data on a rewritable optical disk, overwriting data, and data on the optical disk after recording, when conducting overwrite recording on the rewritable optical disk by using an optical disk apparatus according to the present invention.

FIG. 3 is a diagram showing position relations among existing data on a rewritable optical disk, overwriting data, and data on the optical disk after recording, when an optical disk apparatus according to the present invention conducts overwrite recording on the rewritable optical disk.

When the optical disk apparatus according to the present invention conducts overwrite recording on the rewritable optical disk, data in places where overwriting data is different from existing data on the optical disk are overwrite-recorded in the physically same places on the optical disk. Owing to this feature, the number of times overwrite recording in physically the same place can be suppressed as compared with the number of times in the case where all overwriting data are overwrite-recorded. As a result, the number of times the overwrite recording can be conducted can be increased.

Figure 4:
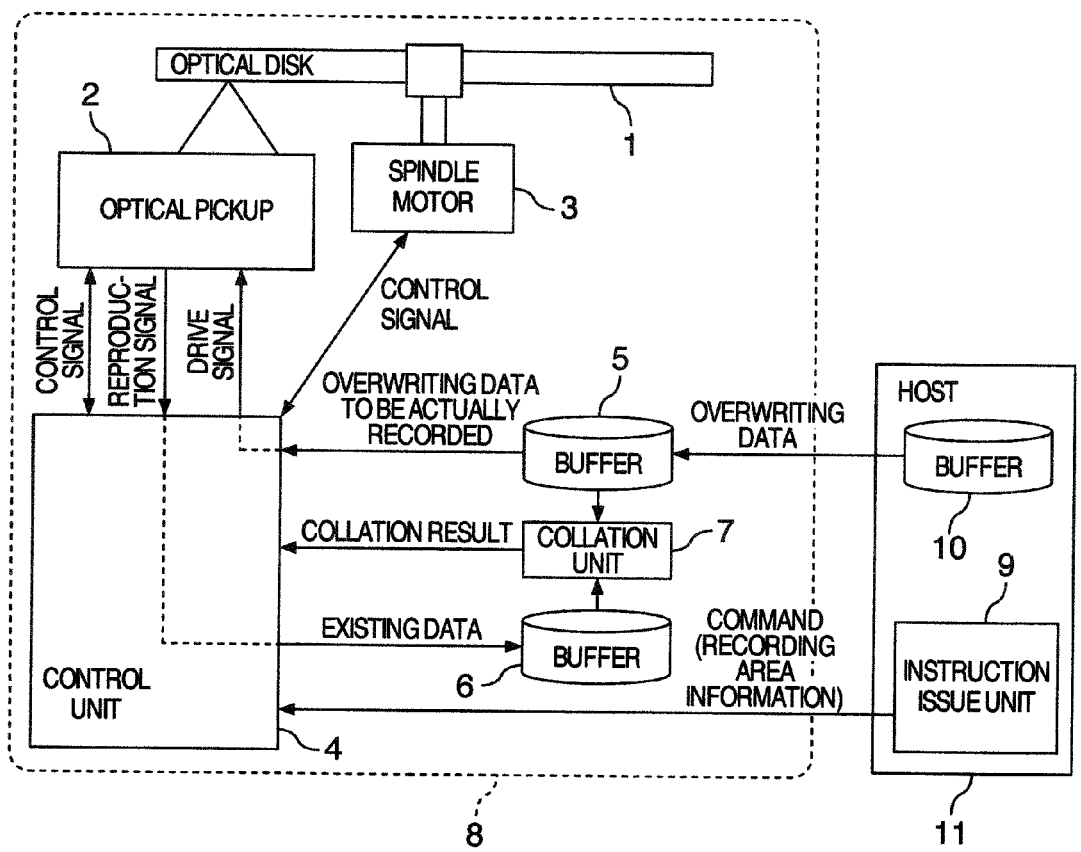
FIG. 4 is a block diagram showing a configuration of an optical disk apparatus according to an embodiment 1.

FIG. 4 is a block diagram showing a configuration of an optical disk apparatus according to the embodiment 1. As shown in FIG. 4, the optical disk apparatus according to the embodiment 1 includes an optical disk drive 8, which is formed of an optical disk 1, an optical pickup 2, a spindle motor 3, a control unit 4, a buffer 5, a buffer 6 and a collation unit 7. The optical disk apparatus further includes a host 11, which is formed of an instruction issue unit 9 for issuing a command and a buffer 10 for storing overwriting data.

The optical disk 1 is a rewritable optical disk which is an optical disk allowing overwrite recording, or a write-once optical disk which is an optical disk allowing write-once recording.

The optical pickup 2 is an optical pickup which can be arbitrarily positioned with respect to the optical disk 1 and which can emit laser light with reproduction power for reproduction and recording power for recording.

The spindle motor 3 is a spindle motor capable of rotating the optical disk 1 at an arbitrary rotation speed.

The control unit 4 is a control unit capable of transmitting a control signal to and receiving a control signal from the optical pickup 2 to exercise positioning control of the optical pickup 2, capable of transmitting a drive signal to the optical pickup 2 to exercise drive control of the laser, capable of transmitting a control signal to and receiving a control signal from the spindle motor 3 to control the rotation of the spindle motor 3, capable of receiving a reproduced signal from the optical pickup 2 and transmitting data obtained by decoding the reproduced signal to the buffer 6, capable of receiving a collation result from the collation unit 7 and recognizing a place where recording should be conducted actually, and capable of receiving data from the buffer 5 and converting the received data to the drive signal.

The buffer 5 is a buffer capable of receiving data from a host and storing the data, and capable of transmitting data to be actually recorded to the control unit. Data stored in the buffer 5 when the optical disk apparatus according to the present invention conducts the overwrite recording is overwriting data.

The buffer 6 is a buffer capable of receiving data from the control unit 4 and storing the data. Data stored in the buffer 6 when the optical disk apparatus according to the present invention conducts overwrite recording is existing data recorded on the optical disk 1.

The collation unit 7 is a collation unit capable of collating the data stored in the buffer 5 with the data stored in the buffer 6 and capable of transmitting information concerning places where the data are different from each other as a result of the collation.

The instruction issue unit 9 is an instruction issue unit capable of specifying a recording area and transmitting a command to record to the control unit 4.

The buffer 10 is a buffer capable of transmitting data stored in it to the buffer 5.

The control unit 4, the buffer 5, the buffer 6, and the collation unit 7 may be mounted collectively into one LSI.

Figure 5:
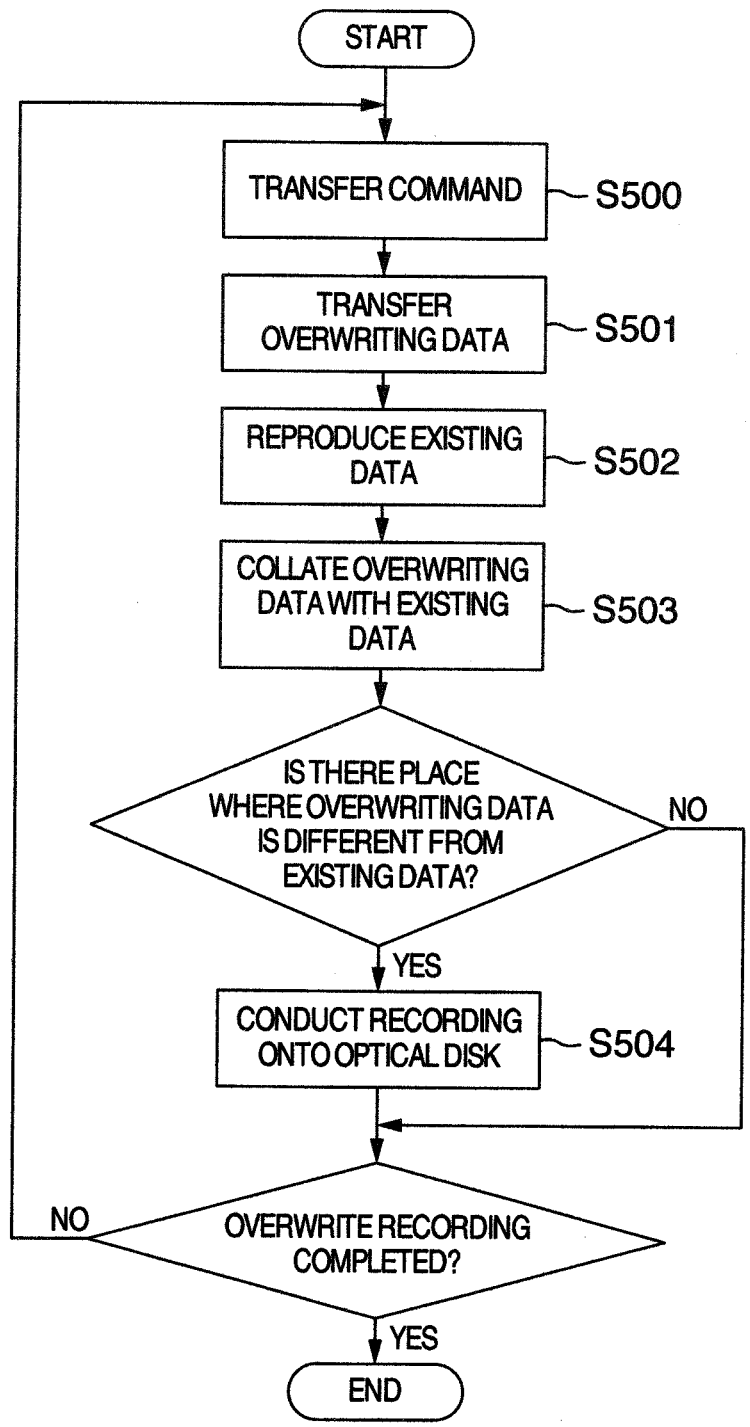
FIG. 5 is a flow chart of overwrite recording processing in the optical disk apparatus according to the embodiment 1.

FIG. 5 is a flow chart showing a sequence of processing in the case where the optical disk apparatus according to the embodiment 1 conducts overwrite recording processing. Hereafter, the overwrite recording processing will be described with reference to FIGS. 4 and 5.

First, command transfer processing S500 is conducted. In the command transfer processing S500, a command is transferred from the instruction issue unit 9 to the control unit 4. The command orders overwrite recording start and gives information concerning a recording area of overwrite recording to the control unit 4.

Upon finishing the command transfer processing S500, overwriting data transfer processing S501 is conducted. In the overwriting data transfer processing S501, the host 11 transfers the overwriting data stored in the buffer 10 to the optical disk drive 8 and the overwriting data is stored in the buffer 5.

Upon finishing the overwriting data transfer processing S501, existing data reproduction processing S502 is conducted. The existing data reproduction processing S502 is conducted as described hereafter.

First, the control unit 4 controls the spindle motor 3 to rotate it at a rotation speed for playing back the optical disk 1. Then, the control unit 4 controls the optical pickup 2 to cause the optical pickup 2 to emit light with reproduction power for reproduction, and positions a laser light spot of the optical pickup 2 into the recording area on the optical disk 1. As a result, the recording area on the optical disk 1 is irradiated with laser light. Then, the optical pickup 2 converts reflected light from the optical disk 1 to a reproduced signal, and the reproduced signal is transmitted to the control unit 4. Then, the control unit 4 decodes the reproduced signal to existing data, and the existing data is stored in the buffer 6.

Upon finishing the existing data reproduction processing S502, collation processing S503 of the overwriting data with the existing data is conducted. In the collation processing S503 of the overwriting data with the existing data, the collation unit 7 collates the overwriting data stored in the buffer 5 with the existing data stored in the buffer 6 and a result of the collation is transferred to the control unit 4. The collation result is information concerning places where the overwriting data is different from the existing data.

If the collation processing S503 of the overwriting data with the existing data is finished and there is a place where the overwriting data is different from the existing data, then recording processing S504 onto the optical disk is conducted. If all overwriting data coincide with the existing data, then processing subsequent to the recording processing S504 onto the optical disk is conducted. In the recording processing S504 onto the optical disk, processing is conducted as described hereafter depending upon whether to conduct logical overwrite recording onto the write-once optical disk or conduct overwrite recording onto the rewritable optical disk.

First, contents of processing executed when conducting the logical overwrite recording onto the write-once optical disk will now be described.

First, the control unit 4 controls the spindle motor 3 to rotate the optical disk 1 at a rotation speed for recording. Then, overwriting data to be actually recorded is transferred from the buffer 5 to the control unit 4. The overwriting data is overwriting data in places depending upon the collation result. Then, the control unit 4 controls the optical pickup 2 to position an optical spot in an unrecorded area on the optical disk 1. Then, the control unit 4 converts the overwriting data to a drive signal and transmits the drive signal to the optical pickup 2 to cause the optical pickup 2 to conduct pulse light emission at recording power for recording onto the optical disk 1. As a result, the overwriting data is recorded in the unrecorded area on the optical disk 1.

On the other hand, when conducting overwrite recording onto the rewritable optical disk, the control unit 4 controls the optical pickup 2 to position the optical spot in the physically same area as the area where the existing data on the optical disk 1 is recorded. Then, the control unit 4 causes the optical pickup 2 to conduct pulse light emission to the physically same area with recording power on the basis of the drive signal. As a result, the overwriting data is overwrite-recorded.

If the recording processing S504 onto the optical disk is finished and overwrite recording is to be conducted in succession, then a series of processing ranging from the command transfer processing S500 to the recording processing S504 onto the optical disk is repeated. If the overwrite recording is to be finished, the processing is finished.

<Embodiment 2>

Figure 6:
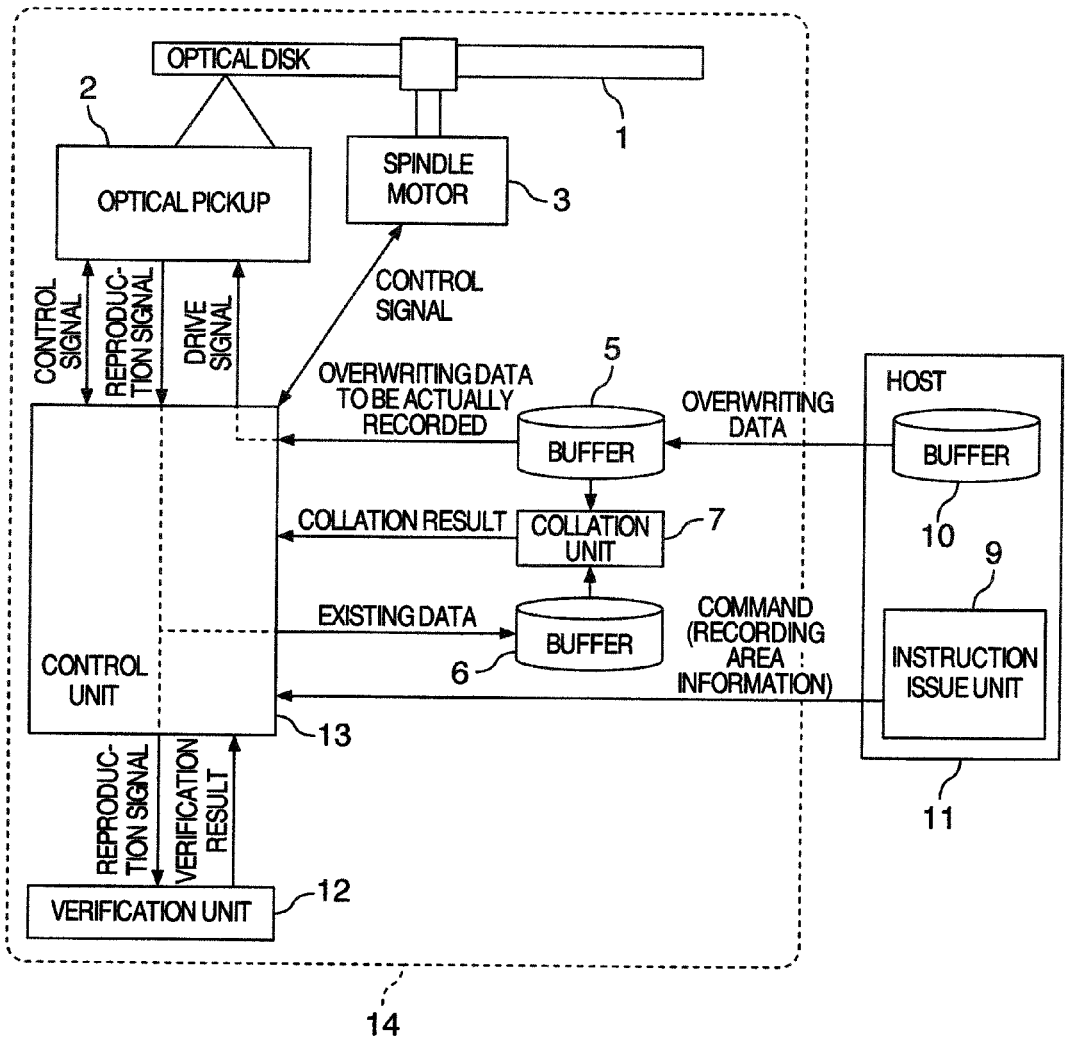
FIG. 6 is a block diagram showing a configuration of an optical disk apparatus according to an embodiment 2.

FIG. 6 is a block diagram showing a configuration of an optical disk apparatus according to an embodiment 2.

An optical disk drive 14 is formed by removing the control unit 4 from the optical disk drive 8 shown in FIG. 4 and adding a verification unit 12 and a control unit 13 to the optical disk drive 8.

The verification unit 12 is a verification unit capable of receiving a reproduced signal from the control unit 13, converting the reproduced signal to an index value which indicates a recording quality, comparing the index value with a predetermined reference, detecting a place where the index value becomes lower than the reference, and transmitting information concerning the detected place to the control unit 13 as a verification result. The index value is, for example, an error rate or the like.

The control unit 13 is a control unit capable of receiving the verification result from the verification unit 12 and controlling recording into the detected place, in addition to the feature of the control unit 4.

Figure 7:
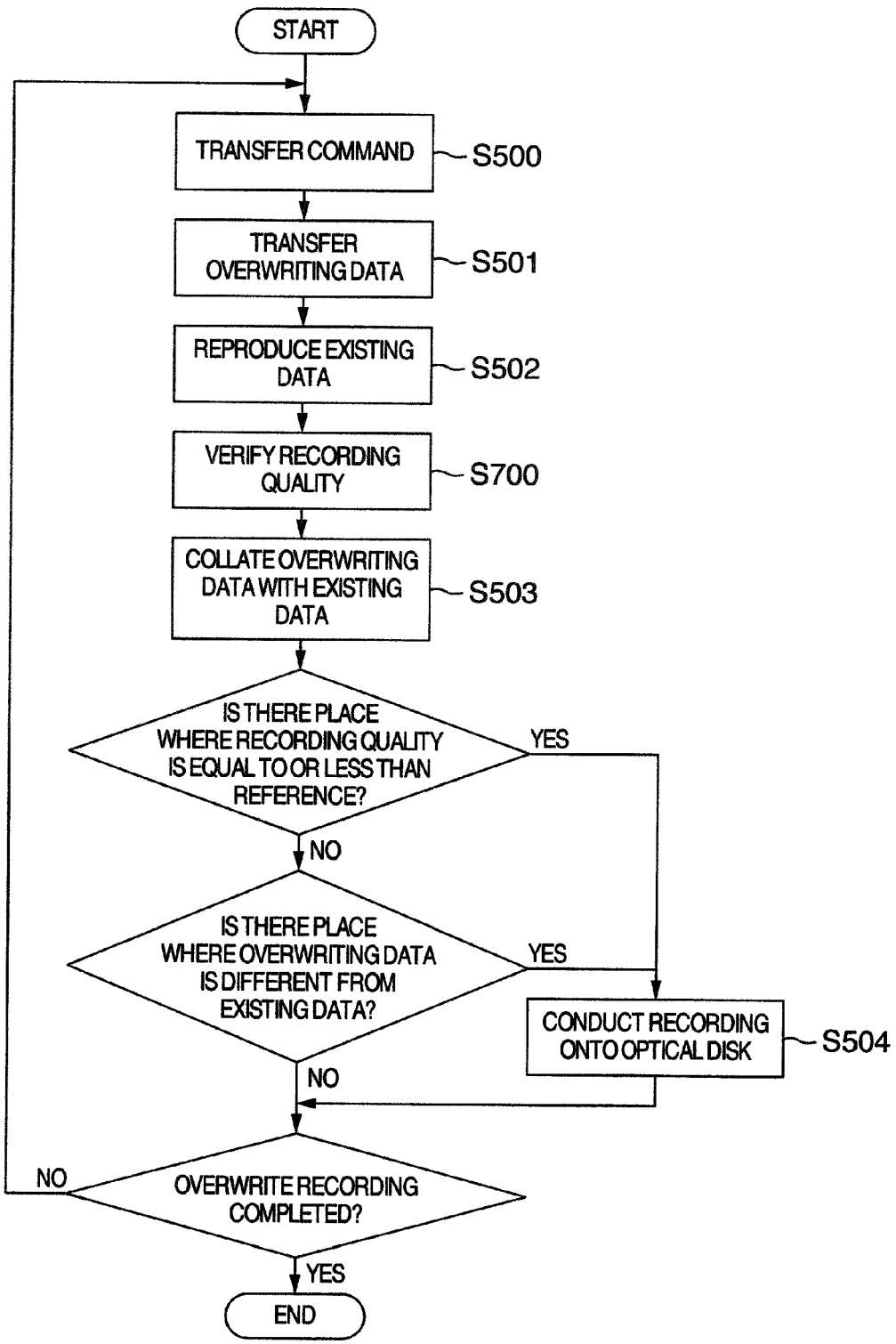
FIG. 7 is a flow chart of overwrite recording processing in the optical disk apparatus according to the embodiment 2.

FIG. 7 is a flow chart showing a sequence of processing in the case where the optical disk apparatus according to the embodiment 2 conducts overwrite recording. Hereafter, the overwrite processing will be described with reference to FIGS. 6 and 7.

The sequence shown in FIG. 7 differs from the sequence shown in FIG. 5 in that recording quality verification processing S700 is inserted after the existing data reproduction processing S502 and the recording processing S504 onto the optical disk is conducted no matter whether there is a place where overwriting data is different from existing data if there is a place where the recording quality is equal to or below the reference.

Hereafter, the recording quality verification processing S700 will be described. First, the reproduced signal transmitted to the control unit 13 by the optical pickup 2 in the existing data reproduction processing S502 is transferred to the verification unit 12 as well. Then, the verification unit 12 converts the reproduced signal to an index value of the recording quality. The index value is, for example, an error rate or jitter. Then, the verification unit 12 finds a verification result from the index value. The verification result is information concerning a place where the recording quality is equal to or less than a reference the optical disk apparatus has. Then, the verification unit 12 transfers the verification result to the control unit 13. The control unit 13 handles the place found on the basis of the verification result as well, as the actually recorded place.

Overwrite recording is conducted not only in a place where the overwriting data is different from the existing data but also in a place found on the basis of the verification result, by adopting the form shown in FIG. 6. As a result, it becomes possible to improve the reproduction compatibility of the overwrite recording place.

<Embodiment 3>

Figure 8:
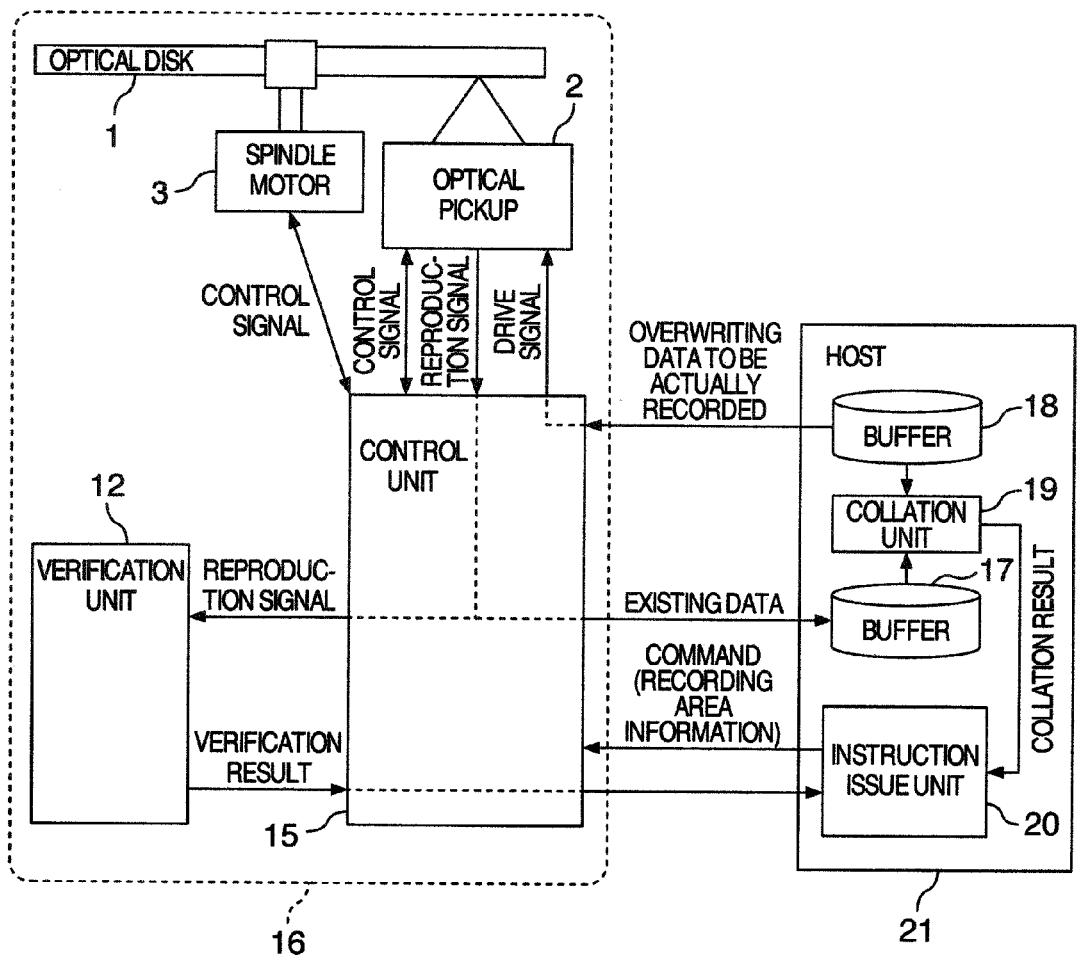
FIG. 8 is a block diagram showing a configuration of an optical disk apparatus according to an embodiment 3.

FIG. 8 is a block diagram showing a configuration of an optical disk apparatus according to an embodiment 3. An optical disk drive 16 is an optical disk drive formed by removing the buffer 5, the buffer 6, the collation unit 7, and the control unit 13 from the optical disk drive 14 shown in FIG. 6 and adding a control unit 15 to the optical disk drive 14.

The control unit 15 is a control unit capable of receiving the verification result from the verification unit 12 and transmitting the verification result to an instruction issue unit 20, in addition to the feature of the control unit 13.

A host 21 is a host formed by removing the buffer 10 and the instruction issue unit 9 from the host 11 and adding a buffer 17, a buffer 18, a collation unit 19, and the instruction issue unit 20 to the host 11.

The buffer 17 is a buffer capable of receiving existing data from the control unit 15 and storing the existing data.

The buffer 18 is a buffer capable of storing overwriting data and transmitting overwriting data to be actually recorded to the control unit 15.

The collation unit 19 is a collation unit capable of collating the overwriting data stored in the buffer 18 with the existing data stored in the buffer 17 and transmitting information concerning places where the overwriting data is different from the existing data to the instruction issue unit 20 as a verification result.

The instruction issue unit 20 is an instruction issue unit capable of receiving the verification result from the control unit 15 and a collation result from the collation unit 19 and transmitting a command which orders to overwrite data in places where the overwriting data is different from the existing data and data in places where the recording quality becomes lower than the reference to the control unit 15.

Figure 9:
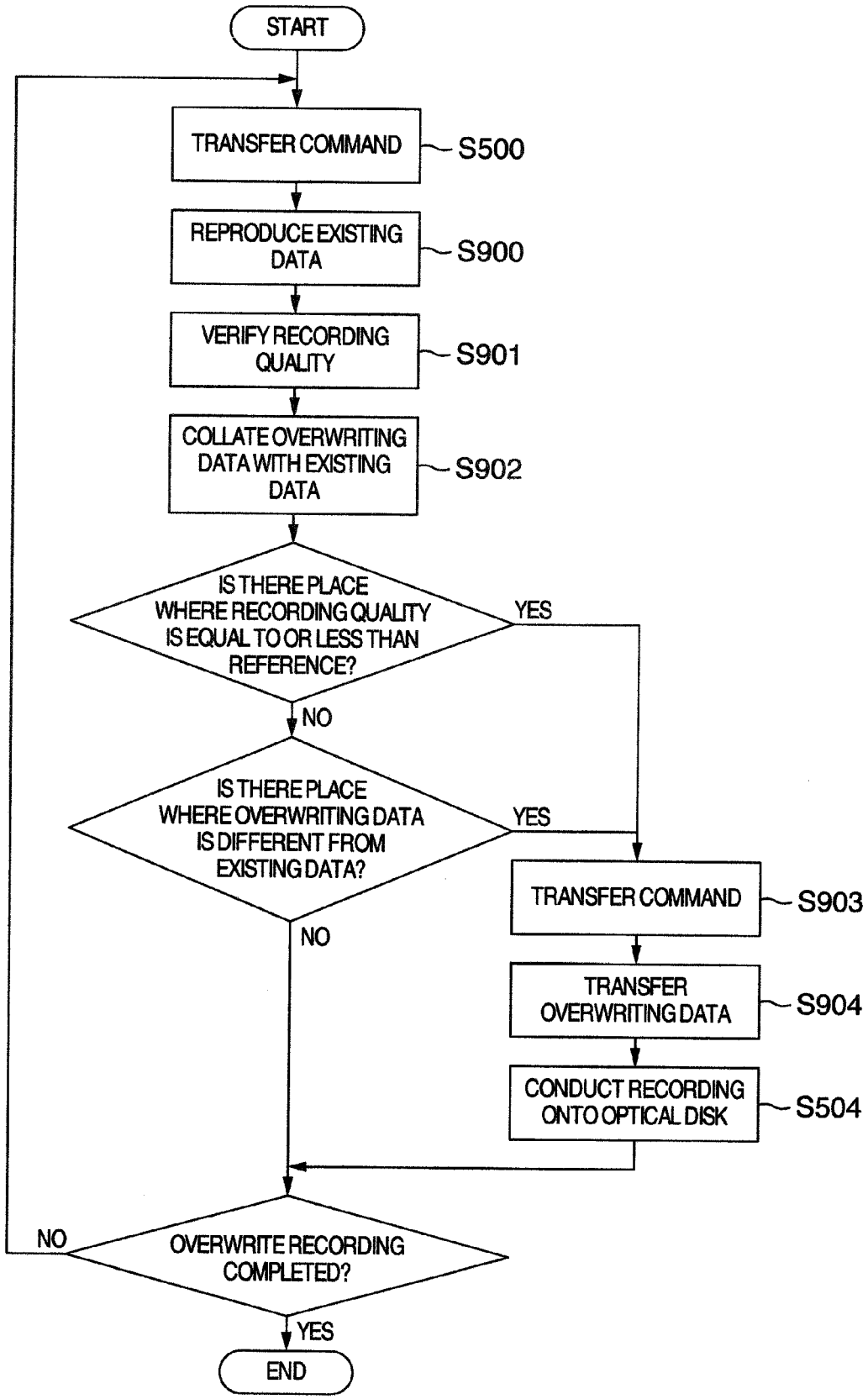
FIG. 9 is a flow chart of overwrite recording processing in the optical disk apparatus according to the embodiment 3.

FIG. 9 is a flow chart showing a sequence of processing in the case where the optical disk apparatus according to the embodiment 3 conducts overwrite recording. Hereafter, the overwrite processing will be described with reference to FIGS. 8 and 9.

Unlike the existing data reproduction processing S502, in existing data reproduction processing S900, existing data is transferred from the control unit 15 to the buffer 17 in the host 21.

Unlike the recording quality verification processing S700, in recording quality verification processing S901, the control unit 15 transfers the verification result supplied from the verification unit 12, to the instruction issue unit 20.

Unlike the collation processing S503 of the overwriting data with the existing data, in collation processing S902 of overwriting data with existing data, the collation unit 19 in the host 21 collates overwriting data with existing data and a collation result is transferred to the instruction issue unit 20.

Unlike the command transfer processing S500, in the command transfer processing S903, the instruction issue unit 20 transfers a command to the control unit 15 in which places found on the basis of the verification result and the collation result are set as a recording area.

Unlike the overwriting data transfer processing S501, in overwriting data transfer processing S904, overwriting data corresponding to the recording area is transferred from the buffer 18 in the host 21 to the control unit 15.

The buffer 5, the buffer 6, and the verification unit 7 can be removed from the optical disk drive 14 in the embodiment 2 by adopting the form in the embodiment 3. As a result, the configuration of the optical disk drive 16 can be simplified.

In the above-described example, the verification unit 12 transmits the verification result to the instruction issue unit 20 in the recording quality verification processing S901. However, it is also possible that the verification unit 12 transfers an index value of the recording quality instead of the verification result and the instruction issue unit 20 makes a decision whether there is a place where the recording quality is equal to or less than a predetermined reference. Since the instruction issue unit 20 makes the decision, the verification unit 12 can be simplified by getting rid of the decision function.

By the way, the present invention is not restricted to the embodiments, but various modifications can be contained. For example, the embodiments have been described in detail in order to explain the present invention intelligibly, and each of the embodiments is not necessarily restricted to an embodiment having all described configuration components. Furthermore, it is also possible add a configuration of another embodiment to a configuration of an embodiment. Furthermore, it is possible to conduct addition, removal or substitution of another configuration on a part of each embodiment.

As for each of the above-described configurations, a part or all thereof may be formed of hardware or may be formed to be implemented by execution of a program in a processor. Furthermore, as for control lines and information lines, those considered to be necessary in description are shown, and all control lines and information lines of a product are not necessarily shown. As a matter of fact, it may be considered that almost all configuration components are connected mutually.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus which conducts write-once recording of data on a write-once optical disk, the optical disk apparatus comprising:
   an optical disk drive having a control unit configured to receive a reproduction command which specifies a reproduction area and orders reproduction, a recording command which specifies a recording area and orders recording, and transfer data; and
   a host having an instruction issue unit configured to issue the reproduction command and the recording command, a buffer configured to store the transfer data, and a collation unit configured to collate existing data on the optical disk with the transfer data;
   wherein a command for ordering reproduction is transferred from the instruction issue unit in the host to the control unit in the optical disk drive, to cause the existing data to be transferred from the control unit to the buffer in the host, and the collation unit collates the existing data with the transfer data;

wherein the optical disk drive records different data in the transfer data onto a unrecorded area of the optical disk based upon the recording command from the host, the different data being different from the existing data on the optical disk; and wherein the optical disk drive records short data having a predetermined length in the transfer data, or less, onto an unrecorded area of the optical disk based upon the recording command from the host, the short data being sandwiched between the different data in the transfer data or between the different data and an end of the transfer data.

2. The optical disk apparatus according to claim 1, the optical disk drive further comprising:

a verification unit configured to verify a recording quality of the optical disk, to verify a recording quality of the recording area, and to transfer data corresponding to a place where the recording quality is equal to or less than a predetermined reference is recorded in an unrecorded area of the optical disk.

3. An optical disk apparatus which conducts write-once recording of data on a write-once optical disk, the optical disk apparatus comprising:

a control unit configured to receive a recording command which specifies a recording area and orders recording, and to receive transfer data; and a collation unit configured to collate existing data on the optical disk with the transfer data, wherein, upon reception of the recording command and the transfer data by the control unit, the collation unit collates the existing data with the transfer data and records different data in the transfer data onto an unrecorded area of the optical disk, the different data being different from the existing data on the optical disk; and wherein the collation unit records short data having a predetermined length in the transfer data, or less, onto an unrecorded area of the optical disk, the short data being sandwiched between the different data in the transfer data or between the different data and an end of the transfer data.

4. The optical disk apparatus according to claim 3, further comprising:

a verification unit configured to verify a recording quality of the optical disk, to verify a recording quality of the recording area, and to transfer data corresponding to a place where the recording quality is equal to or less than a predetermined reference is recorded in an unrecorded area of the optical disk.

* * * * *